(12) United States Patent
Shin et al.

(10) Patent No.: US 12,218,614 B2
(45) Date of Patent: Feb. 4, 2025

(54) STEERING MOTOR CONTROL DEVICE AND METHOD

(71) Applicant: HL MANDO CORPORATION, Gyeonggi-do (KR)

(72) Inventors: Seongwoo Shin, Seoul (KR); JongHoon Lee, Incheon (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 158 days.

(21) Appl. No.: 18/084,511

(22) Filed: Dec. 19, 2022

(65) Prior Publication Data
US 2023/0198450 A1    Jun. 22, 2023

(30) Foreign Application Priority Data
Dec. 20, 2021    (KR) .................. 10-2021-0182320

(51) Int. Cl.
*H02P 29/028*    (2016.01)
*B62D 5/04*    (2006.01)

(52) U.S. Cl.
CPC .......... *H02P 29/028* (2013.01); *B62D 5/0487* (2013.01)

(58) Field of Classification Search
CPC ............................. H02P 29/028; B62D 5/0487

USPC .......................................................... 318/445
See application file for complete search history.

(56) References Cited

U.S. PATENT DOCUMENTS

| | | | | |
|---|---|---|---|---|
| 2018/0079449 A1* | 3/2018 | Furukawa | ............ | B62D 5/0403 |
| 2018/0244308 A1* | 8/2018 | Furukawa | ............ | B62D 5/0484 |
| 2020/0114964 A1* | 4/2020 | Kim | ....................... | B60W 10/20 |
| 2020/0198696 A1* | 6/2020 | Kawamura | ............... | H02P 6/28 |
| 2021/0135513 A1* | 5/2021 | Takizawa | ................ | H02P 25/22 |

* cited by examiner

*Primary Examiner* — Kawing Chan
(74) *Attorney, Agent, or Firm* — WOMBLE BOND DICKINSON (US) LLP

(57) ABSTRACT

The embodiments relate to a steering motor control device and method. An embodiment may provide a steering motor control device for controlling a steering motor including a first winding and a second winding including a receiver for receiving requested output information on an output of the steering motor, a determiner configured to, if one of the first winding and the second winding is determined to fail, determine output distribution information based on the requested output information and predetermined reference output information, and determine normal winding control information and faulty winding control information based on the output distribution information, and a controller for controlling an operation of the normal winding and an operation of the failed winding.

7 Claims, 14 Drawing Sheets

STEERING MOTOR CONTROL DEVICE AND METHOD

CROSS REFERENCE TO RELATED APPLICATION

This application claims priority from Korean Patent Application No. 10-2021-0182320, filed on Dec. 20, 2021, which is hereby incorporated by reference for all purposes as if fully set forth herein.

TECHNICAL FIELD

Embodiments of the present disclosure relate to a steering motor control device and method, and more particularly, to a steering motor control device and control method for controlling power distribution between a normal winding and a failed winding in a steering motor.

In a steering system of a vehicle, there is gradually increasing the use of electronic control devices. Therefore, there is also increasing the importance of redundancy technology for ensuring safety. In particular, in the case of a steering motor, there are generally used a dual winding motor (DWM), a dual control device, and the like.

In the case that a part of these dual winding motor is out of order or fails, it is difficult to output more than half of the maximum output when only the normal windings are driven, and there may be a problem in that torque ripple occurs when the failed windings are driven together.

Accordingly, there is a need for a technique capable of reducing torque ripple while increasing output in the case that some of windings of the steering motor are out of order or fail.

SUMMARY

In this background, embodiments of the present disclosure is to provide a steering motor control device and method capable of maintaining a high actual output compared to a requested output even if some of windings of the steering motor fail.

In addition, the present disclosure is to provide a steering motor control device and method capable of reducing torque ripple while outputting using both a normal winding and a failed winding.

In an aspect of the present disclosure, there is provided a steering motor control device for controlling a steering motor including a first winding and a second winding including a receiver configured to receive requested output information on an output requested for the steering motor, a determiner configured to, if one of the first winding and the second winding is determined to fail, determine output distribution information based on the requested output information and predetermined reference output information, and determine normal winding control information for a normal winding and faulty winding control information for a failed winding among the first winding and the second winding based on the output distribution information, and a controller configured to control an operation of the normal winding based on the normal winding control information and control an operation of the failed winding based on the faulty winding control information.

In another aspect of the present disclosure, there is provided a steering motor control method for controlling a steering motor including a first winding and a second winding including receiving requested output information on an output requested for the steering motor, determining, if one of the first winding and the second winding is determined to fail, output distribution information based on the requested output information and predetermined reference output information, and determining normal winding control information for a normal winding and faulty winding control information for a failed winding among the first winding and the second winding based on the output distribution information, and controlling an operation of the normal winding based on the normal winding control information and controlling an operation of the failed winding based on the faulty winding control information.

According to embodiments of the present disclosure, it is possible to provide a steering motor control device and method capable of reducing torque ripple while outputting using both a normal winding and a failed winding.

DETAILED DESCRIPTION

Figure 1:
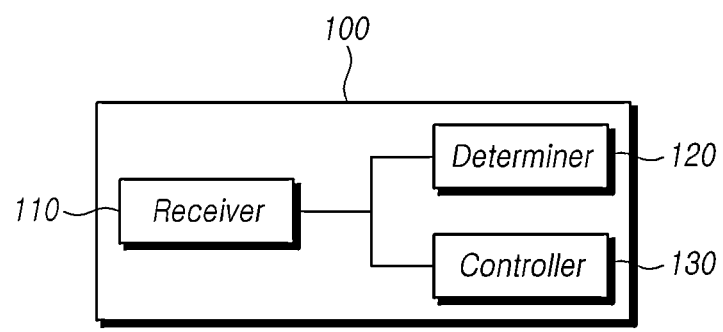
FIG. 1 is a block diagram of a steering motor control device according to the present disclosure.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

FIG. 1 is a block diagram of a steering motor control device according to the present disclosure.

Referring to FIG. 1, a steering motor control device 100 according to the present disclosure may include a receiver 110, a determiner 120 and a controller 130. In addition, the receiver 110, the determiner 120 and the controller 130 may be connected to each other.

For example, the steering motor control device 100 may include the receiver 110 for receiving requested output information on an output requested for the steering motor, the determiner 120 for determining, if one of the first winding and the second winding is determined to fail, output distribution information based on the requested output information and predetermined reference output information, and determining normal winding control information for a normal winding and faulty winding control information for a failed winding among the first winding and the second winding based on the output distribution information, and the controller 130 for controlling an operation of the normal winding based on the normal winding control information and controlling an operation of the failed winding based on the faulty winding control information.

The receiver 110 may be connected to other devices in the vehicle and may receive information from other devices in the vehicle. The receiver 110 may receive information at any time or at a regular period. The information received by the receiver 110 may include requested output information, steering motor information, and the like.

The requested output information may include information about the corresponding output amount in the case that it is requested to output a certain physical amount by driving the steering motor. In this case, the requested output information may include information expressed in the form of torque or force (Nt). For example, in steering assist control, the requested output information may include information on a required amount of torque requested for a steering motor.

The steering motor information may include any information about the steering motor, and may include first winding information about a first winding included in the steering motor and second winding information about a second winding. For example, the steering motor information may include information on the total maximum output of the steering motor, the maximum output and normal operation status of each winding, other performance, specification, and the like.

The determiner 120 may be connected to at least one of the receiver 110 and the controller 130. In this case, the determiner 120 may determine new information based on the information received from the receiver 110 or re-determine the received information using other information or a preset value.

Alternatively, the determiner 120 may set new information or values based on the received information or reset preset information or values. In addition, the determiner 120 may provide the determined or set information to the controller 130.

For example, the determiner 120 may determine whether the first winding and the second winding are each faulty based on at least one of the requested output information and the steering motor information, and, if it is determined that one of the first winding and the second winding fails, may determine output distribution information.

In this case, the determiner 120 may determine whether of a failure of the first winding fails based on the first winding information included in the steering motor information, and may determine whether of a failure of the second winding fails based on the second winding information included in the steering motor information.

The failure of the steering motor may include a failure of the entire first winding or a failure of the entire second winding. In addition, the failure of the steering motor may include not only failure of each winding as a whole, but also failure of a part of each winding. For example, in the case of a dual 3-phase motor, a failure such as an open phase of one of the 3-phases of each winding may also be included.

The determiner 120 may determine output distribution information based on at least one of requested output information and reference output information. In addition, the determiner 120 may determine normal winding control information on a normal winding and faulty winding control information on a failed winding based on the output distribution information.

The reference output information may include information about a criterion for distributing power or output to each of the first winding and the second winding in the steering motor. Alternatively, the reference output information may include information about a criterion for distributing output to each of the normal winding and the failed winding.

For example, the reference output information may include information about an output amount corresponding to 50% of the total output of the steering motor regardless of whether the first winding or the second winding fails, based on the total output of the steering motor.

For example, if the total output of the steering motor is 1000 and the maximum outputs of the first winding and the second winding are each equal to 500, the reference output information may be set to include only information having a value of 500.

The determiner 120 may set the output distribution information in advance before determining whether the first winding and the second winding have failed, and may reset the output distribution information if it is determined that one of the first and second windings has failed.

For example, the determiner 120 may determine the output distribution information to include first output section information and second output section information regarding the output section of the steering motor. In this case, the output distribution information may include information determined to divide into the first output section and the second output section, respectively, and to distribute the output for each section.

In addition, the determiner 120 may divide the output section into a first output section and a second output section based on the requested output information and the reference output information, and may determine the first output section information and the second output section information to include information about section size and section distribution winding for each output section.

Information on section distribution windings may include information on which windings of the steering motor are distributed to a corresponding output section. In this case, the information on the section distribution winding may include information on windings distributed to the corresponding output section among the first winding and the second winding, or information on the windings distributed to the corresponding output section among the normal winding and the failed winding.

The information on the section size may include information about the size or magnitude of the output amount in the corresponding output section. In this case, the magnitude or size of the output may be information expressed as an absolute numerical value related to the amount of torque (Nm) or the amount of force (N), or may be information expressed in a specific ratio based on one of the total output of the steering motor, the requested output information, and the reference output information.

The information on the section size may be set differently according to the comparison result of the requested output information and the reference output information. In addition, the section sizes of the output section to which normal windings are distributed and the output section to which failed windings are distributed may also be set differently from each other.

For example, if the requested output information is equal to or less than the reference output information, with respect to the first output section information, the section distribution winding may be determined as a normal winding and the section size may be determined as the size of the requested output information. In addition, for the second output section information, the section distribution winding may be determined as a failed winding and the section size may be determined as 0.

For another example, if the requested output information exceeds the reference output information, with respect to the first output section information, the section distribution winding may be determined as a normal winding and the section size may be determined as the size of the reference output information. In addition, for the second output section information, the section distribution winding may be determined as a failed winding, and the section size may be determined by subtracting the size of the reference output information from the size of the requested output information.

Meanwhile, the determiner 120 may determine the output distribution information to include distribution ratio information. In this case, the distribution ratio information may include information about the output distribution ratio of the normal winding and the failed winding.

In addition, the determiner 120 may additionally set faulty limit output information if it is determined that one of the first winding and the second winding fails. In addition, the faulty limit output information may be used to determine the output distribution information.

For example, if the requested output information exceeds the faulty limit output information, the output distribution information may be determined using faulty limit output information instead of requested output information.

Specifically, in the case of using the faulty limit output information, the section size of the second output section information may be re-determined by subtracting the section size of the first output section information from the size of the faulty limit output information.

Accordingly, the determiner 120 may determine output distribution information using the faulty limit output information if some windings of the steering motor have failed. Therefore, it is possible to reduce torque ripple caused by a failed winding in the output of the steering motor.

In addition, the determiner 120 may determine normal winding control information and faulty winding control information based on the output distribution information.

In this case, the normal winding control information may include information about a normal winding determined based on the first winding information and the second winding information. In addition, the normal winding control information may include information about an output section for which distribution is required for a normal winding, determined based on the first output section information and the second output section information, information about the amount of output, and the like.

The faulty winding control information may include information about a failed winding determined based on the first winding information and the second winding information. In addition, the faulty winding control information may include information about an output section for which distribution is required for a failed winding, determined based on the first output section information and the second output section information, information about the amount of output, and the like.

In addition, the normal winding control information and the faulty winding control information may include information about a distribution ratio for a normal winding and a distribution ratio for a failed winding determined based on the distribution ratio information.

For example, the normal winding control information may include information about a normal winding among all information included in the output distribution information, and may further include information necessary for controlling the normal winding determined based on this information.

The faulty winding control information may also include information about the failed winding among all information included in the output distribution information, and may further include information necessary for controlling the failed winding determined based on this information.

The controller 130 may be connected to at least one of the receiver 110 and the determiner 120. In this case, the controller 130 may control the steering motor based on at least one of information received from the receiver 110 and information calculated from the determiner 120.

For example, the controller 130 may control the operation of a normal winding based on normal winding control information, and may control the operation of a failed winding based on faulty winding control information. In addition, the operation control of the winding may include controlling the output operation and output amount of each winding.

For example, in the case that the steering motor maximum output is 1000, the requested output information is 700, and the reference output information is 500, if it is determined that the normal winding is the first winding, based on the normal winding control information, the normal windings are distributed in the first output section, and size of the first output section information includes information determined as 500, the controller 130 may control the first winding corresponding to a normal winding to output at a size of 500 corresponding to the first output section.

In addition, if it is determined that the failed winding is the second winding, based on the faulty winding control information, the failed windings are distributed in the second output section, and size of the second output section information includes information determined as 200, the controller 130 may control the second winding corresponding to a failed winding to output at a size of 200 corresponding to the second output section.

As described above, according to the present disclosure, if one of the first winding and the second winding of the steering motor fails, the steering motor control device 100 may determine output distribution information for each winding, and may control the output of each winding based on normal winding control information and faulty winding control information.

Accordingly, it is possible to maintain a high level of actual output with respect to the requested output when compared to the case of outputting simply using only normal windings, and to reduce the torque ripple when comparing to the case of outputting simply using all the failed windings.

It will be described in detail an embodiment of determining the output distribution information and controlling the operation of each winding of the steering motor with reference to FIGS. 3 to 5 below.

Figure 2:
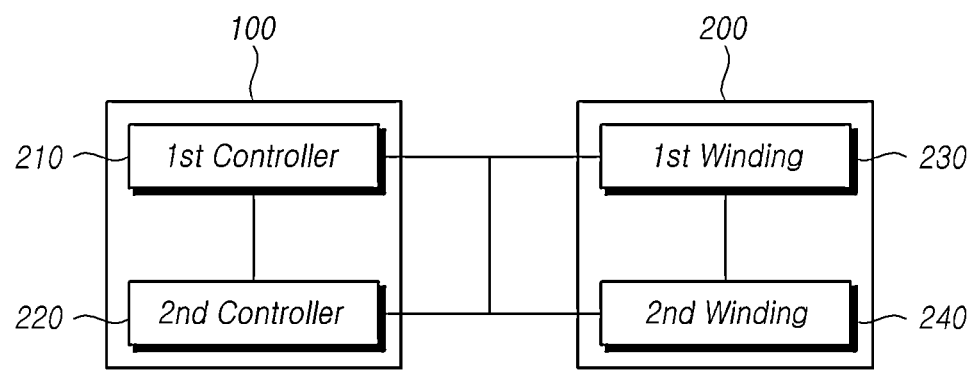
FIG. 2 illustrates an example of a dual winding motor and a control device thereof according to an embodiment.

FIG. 2 illustrates an example of a dual winding motor and a control device thereof according to an embodiment.

Referring to FIG. 2, a steering motor 200 and a steering motor control device 100 according to an embodiment may be connected to each other, and the steering motor 200 may be controlled by the steering motor control device 100.

The steering motor 200 may be a dual winding motor (DWM) or double wound motor including a first winding 230 and a second winding 240, and the steering motor control device 100 may include a first controller 210 and a second controller 220. In this case, each controller may control each winding of the steering motor, and specifically, may control the output of each winding.

In addition, the steering motor control device 100 may utilize only one of the first controller 210 and the second controller 220, or both of the first controller 210 and the second controller 220 in controlling the steering motor 200.

For example, the steering motor control device 100 may control both the first winding 230 and the second winding 240 of the steering motor 200 using only one of the first controller 210 and the second controller 220.

As another example, the first controller 210 may control the first winding 230, and the second controller 220 may control the second winding 240. Specifically, the first controller 210 may control the output of the first winding 230, and the second controller 220 may control the output of the second winding 240. Furthermore, if one of the first controller 210 and the second controller 220 fails, the other one may control the first winding 230 and the second winding 240.

Alternatively, if one of the first winding 230 and the second winding 240 fails, the other winding may be controlled using both the first controller 210 and the second controller 220. Alternatively, one of the first controller 210 and the second controller 220 may be used to control the other winding.

As described above, the configuration of the steering motor control device 100 and the steering motor 200 shown in FIG. 2 may be applied to both the steering motor control device and control method described with reference to FIGS. 3 to 10 below.

Figure 3A:
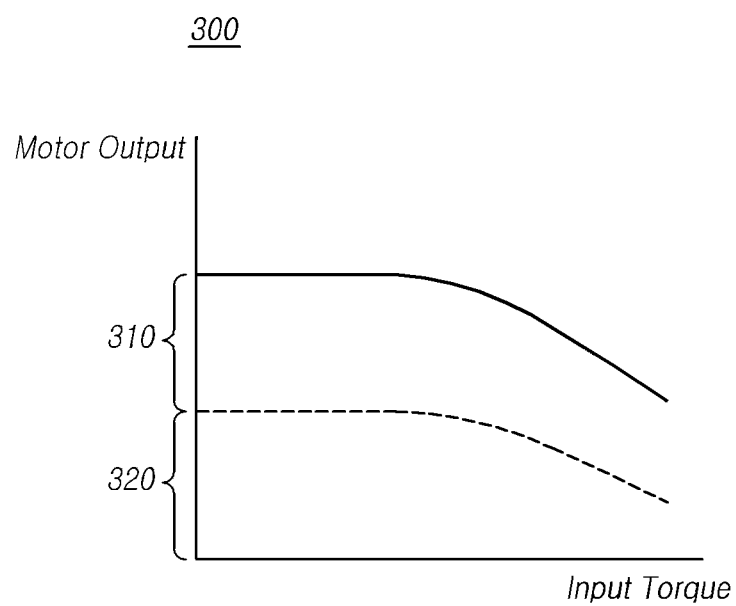
FIGS. 3A and 3B are graphs for explaining an output and an output section depending on whether of a failure in controlling a steering motor according to an embodiment.
Figure 3B:
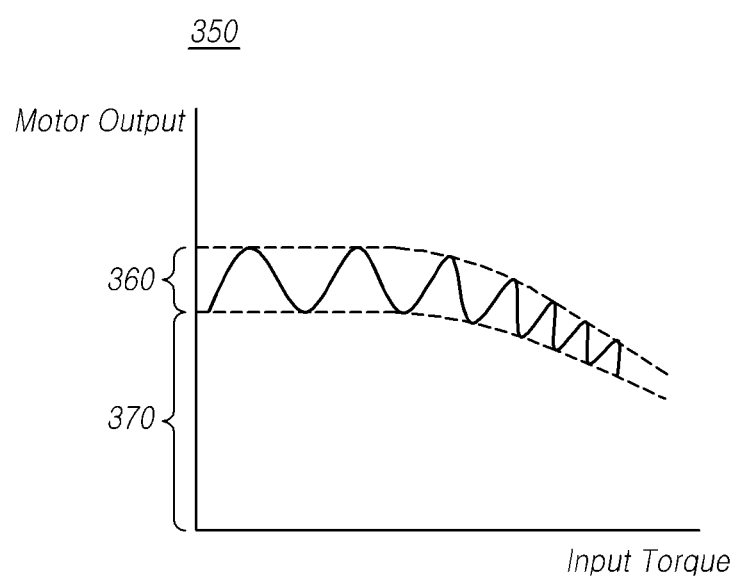

FIGS. 3A and 3B are graphs for explaining an output amount and an output section depending on whether of a failure in controlling a steering motor according to an embodiment.

Referring to FIGS. 3A and 3B, the steering motor control device 100 according to an embodiment may perform the control of the output operation for each winding based on first output section information and second output section information.

Specifically, the graphs shown in FIGS. 3A and 3B represent motor output versus input torque with the input torque as the X-axis and the motor output as the Y-axis. FIG. 3A illustrates a graph 300 of the normal output section divided into a first output section 320 at normal time and a second output section 310 at normal time. FIG. 3B illustrates a graph 350 of an output section in case of failure, which is divided into a first output section 370 in case of failure and a second output section 360 in case of failure, when some windings of the steering motor 200 fail.

For example, the steering motor control device 100 may divide the output of the steering motor 200 into a first output section and a second output section, and may set the output distribution information to include the first output section information and the second output section information.

The first output section information and the second output section information may be set in advance before determining whether the steering motor 200 has a failure. Alternatively, if it is determined that some windings of the steering motor 200 have a failure thereafter, the first output section information and the second output section information may be updated in such a way that all or part of preset information is determined and set again.

As a specific example, the first output section information may include information on a section distribution winding and a section size of the first output section, and the second output section information may include information on a section distribution winding and a section size of the second output section.

Here, the information on the section distribution winding may include information on windings distributed to the corresponding output section. In addition, the information on the section size may be set in the form of an output amount distributed to the corresponding output section, and the distributed output amount may be set based on at least one of the maximum output of the steering motor 200, the requested output information, and the reference output information.

For example, in the case that the maximum output of the steering motor 200 is 1000 Nm, the requested output information is 700 Nm, and the reference output information is 500 Nm, the first output section information and the second output section information may be set differently according to each case, such as case 1 and case 2 below.

1) Case 1: If it is determined that all windings of the steering motor 200 are normal.

For the first output section information, the section size of may be set as 50% of the requested output information, and the section distribution winding may be set as the second winding 240. For the second output section information, the section size may be as 50% of the requested output information, and section distribution winding may be set to the first winding 230.

As an example of this case, for the first output section 320 at normal time, the section size may be set to 350 Nm, which is 50% of the requested output information 700 Nm, and the section distribution winding may be set to the first winding 230. For the second output section 310 at normal time, a section size may be set to 350 Nm, which is 50% of the requested output information 700 Nm, and the section distribution winding may be set to the second winding 240.

Then, information on the first output section and information on the second output section may be set based on the settings for the first output section 320 at normal time and the second output section 310 at normal time as described above.

2) Case 2: If it is determined that the first winding 230 of the steering motor 200 fails.

The first output section information and the second output section information may be reset or re-determined based on at least one of the maximum output of the steering motor 200, the requested output information, and the reference output information.

As an example of this case, for the first output section 370 in case of failure, the section size may be set to 500 Nm based on the reference output information and the section distribution winding may be set to the first winding 230. In addition, for the second output section 360 in case of a failure, the section size may be set to 200 based on the requested output information of 700 Nm and the reference output information of 500 Nm, and the section distribution winding may be set to the second winding 240.

Then, based on the settings for the first output section 370 in case of failure and the second output section 360 in case of failure as described above, the first output section information and the second output section information may be determined in a manner of resetting.

Hereinafter, in FIGS. 4 and 5, in the case that the first winding 230 is determined to be normal and the second winding 240 is determined to fail, it will be described an embodiment according to a method of simply distributing output by 50% (hereinafter referred to as "first method") and an embodiment according to a method of distributing output according to the present disclosure (hereinafter referred to as the "second method") in a comparison manner.

Figure 4A:
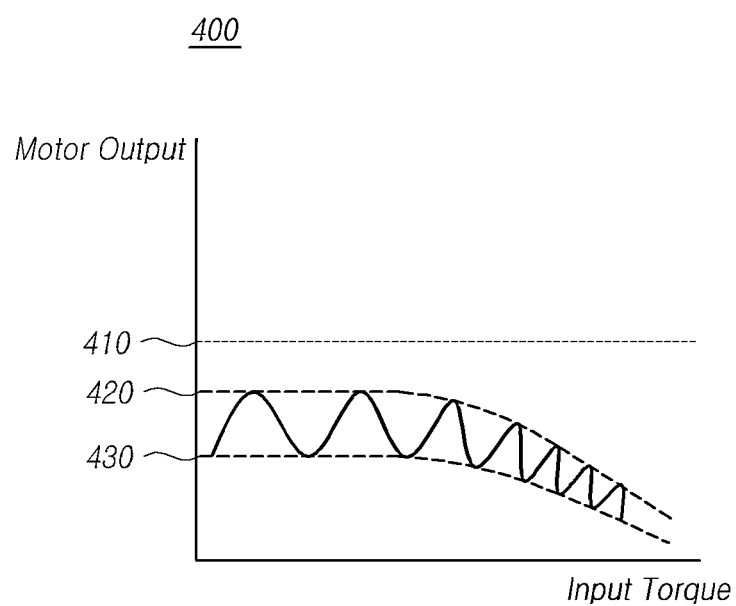
FIGS. 4A and 4B are graphs illustrating a case where a requested output is less than or equal to a reference output in controlling a steering motor according to an embodiment.
Figure 4B:
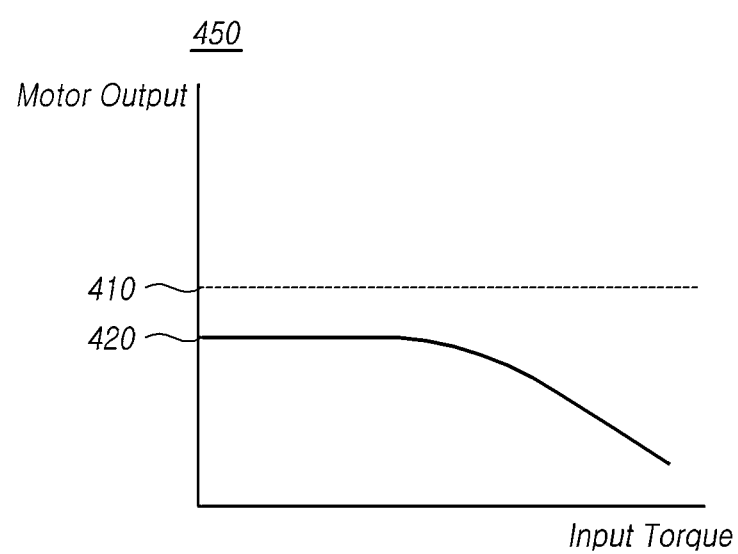

FIGS. 4A and 4B are graphs illustrating a case where a requested output is less than or equal to a reference output in controlling a steering motor according to an embodiment.

Referring to FIGS. 4A and 4B, if the requested output is equal to or less than the reference output, the steering motor control device 100 according to an embodiment may simply distribute the output by 50% for each winding, or may distribute output based on the requested output information and the reference output information.

Specifically, FIG. 4A represents a below-reference first method graph 400 in which the output is distributed by dividing into the first output section and the second output section based on at least one of the reference output information 410, the requested output information 420, and the simple section boundary 430, and the first method is applied.

FIG. 4B is a below-reference second method graph 450 illustrating the result of applying the second method.

In this case, it is assumed that the total maximum output of the steering motor 200 is 1000 Nm, the maximum output of the first winding and the second winding is 500 Nm, respectively, the reference output information 410 is 500 Nm, and the requested output information 420 is 400 Nm, and the simple section boundary 430 is 200 Nm.

First, it will be described the below-reference first method graph 400. In the case of the first output section information, the section distribution winding may be set to a normal first winding, and the section size may be set to a size of 200 Nm corresponding to 50% of the lower part with respect to the simple section boundary 430 among the size of 400 Nm of the requested output information 420.

In addition, in the case of the second output section information, the section distribution winding may be set to the failed second winding, and the section size may be set to a size of 200 Nm corresponding to 50% of the upper portion of the simple section boundary 430 among the size of 400 Nm of the requested output information 420.

In this case, since 200 Nm is output by the normal first winding in the first output section and 200 Nm is output by the failed second winding in the second output section, respectively. Accordingly, the output may be 200 Nm+200 Nm=400 Nm, thus, 400 Nm of the requested output information 420 are satisfied.

However, since the 200 Nm portion output from the second output section is the portion output from the failed second winding, torque ripple may occur at 50% of the total output of 400 Nm, corresponding to 200 Nm.

Then, it will be described the below-reference second method graph 450. In the case of the first output section information, the section distribution winding may be set to a normal first winding. In addition, since the size of 500 Nm of the reference output information 410 exceeds the size of 400 Nm of the requested output information 420, the section size may be set to a size of 400 Nm corresponding to the size of the requested output information 420.

In the case of the second output section information, the section distribution winding may be set to the failed second winding, and the section size may be set to a size of 0 Nm excluding the size of 400 Nm distributed to the normal first winding in the first output section from the size of 400 Nm of the requested output information 420.

In this case, since 400 Nm is output by the normal first winding in the first output section and 0 Nm is output by the failed second winding in the second output section, therefore, the output may be 400 Nm+0 Nm=400 Nm, thus, 400 Nm of the requested output information 420 are satisfied.

In addition, since the portion output by the failed second winding in the second output section corresponds to 0 Nm, torque ripple occurs at the 0% portion corresponding to 0 Nm of the total output of 400 Nm. That is, although the second winding fails, the resulting torque ripple may be not generated.

Accordingly, in the case where the requested output is less than or equal to the reference output, if the output is distributed according to the present disclosure, the torque ripple due to the failure of the secondary winding can be reduced from 50% to 0% while maintaining the output that satisfies all requested outputs, compared to simply distributing the output by 50%.

Figure 5A:
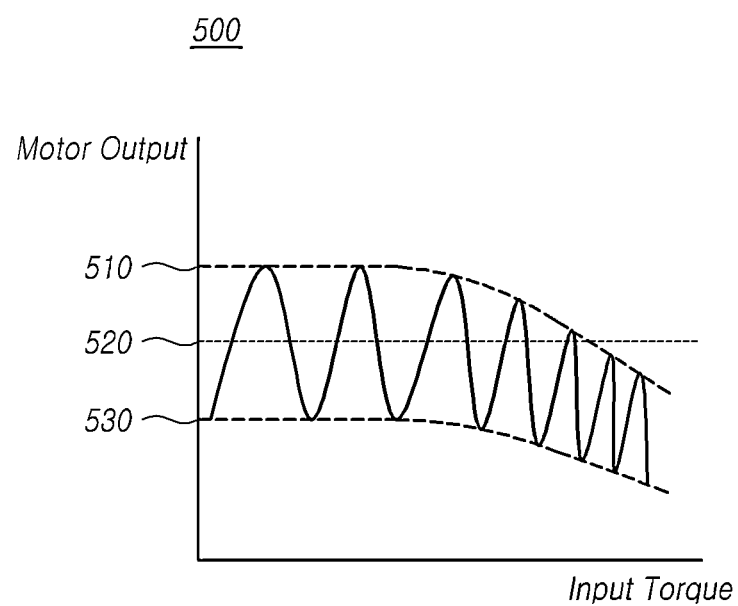
FIGS. 5A and 5B are graphs illustrating a case in which a requested output exceeds a reference output in controlling a steering motor according to an embodiment.
Figure 5B:
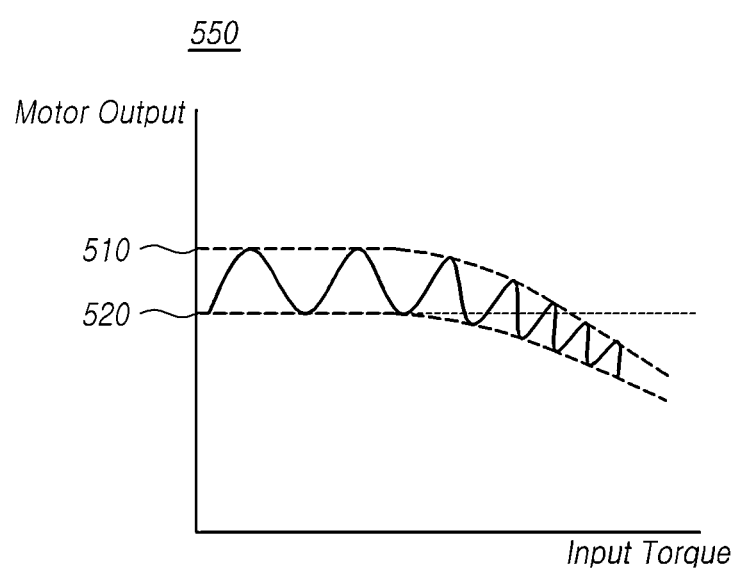

FIGS. 5A and 5B are graphs illustrating a case in which a requested output exceeds a reference output in controlling a steering motor according to an embodiment.

Referring to FIGS. 5A and 5B, if the requested output exceeds the reference output, the steering motor control device 100 according to an embodiment may simply distribute the output by 50% for each winding, or may distribute output based on the requested output information and the reference output information.

Specifically, FIG. 5A represents an above-reference first method graph 500 in which the output is distributed by dividing into the first output section and the second output section based on at least one of the requested output information 510, the reference output information 520, and the simple section boundary 530, and the first method is applied. FIG. 5B is an above-reference second method graph 550 illustrating the result of applying the second method.

In this case, it is assumed that the total maximum output of the steering motor 200 is 1000 Nm, the maximum output of the first winding and the second winding is 500 Nm, respectively, the requested output information 510 is 800 Nm, the reference output information 520 is 500 Nm, and the simple section boundary 530 is 400 Nm.

First, it will be described a case of simply distributing the output by 50%. In the case of the first output section information, the section distribution winding may be set to a normal first winding, and the section size may be set to a size of 400 Nm corresponding to 50% of the lower part with respect to the simple section boundary 530 among the size of 800 Nm of the requested output information 510.

In addition, in the case of the second output section information, the section distribution winding may be set to the failed second winding, and the section size may be set to a size of 400 Nm corresponding to 50% of the upper portion of the simple section boundary 530 among the size of 800 Nm of the requested output information 510.

In this case, since 400 Nm is output by the normal first winding in the first output section and 400 Nm is output by the failed second winding in the second output section, respectively. Accordingly, the output may be 400 Nm+400 Nm=800 Nm, thus, 800 Nm of the requested output information 510 are satisfied.

However, since the 400 Nm portion output from the second output section is the portion output from the failed second winding, torque ripple may occur at 50% of the total output of 800 Nm, corresponding to 400 Nm.

Then, it will be described a case of distributing output according to the present disclosure. In the case of the first output section information, the section distribution winding may be set to a normal first winding. In addition, since the size of 800 Nm of the requested output information 510 exceeds the size of 500 Nm of the reference output information 520, the section size may be set to a size of 500 Nm corresponding to the size of the reference output information 520.

In the case of the second output section information, the section distribution winding may be set to the failed second winding, and the section size may be set to a size of 300 Nm excluding the size of 500 Nm distributed to the normal first winding in the first output section from the size of 800 Nm of the requested output information 510.

In this case, since 500 Nm is output by the normal first winding in the first output section and 300 Nm is output by the failed second winding in the second output section, therefore, the output may be 500 Nm+300 Nm=800 Nm, thus, 800 Nm of the requested output information 510 are satisfied.

In addition, since the portion output by the failed second winding in the second output section corresponds to 300 Nm, torque ripple occurs at the 37.5% portion corresponding to 300 Nm of the total output of 800 Nm.

Accordingly, in the case where the requested output exceeds the reference output, if the output is distributed according to the present disclosure, the torque ripple due to the failure of the secondary winding can be reduced from 50% to 37.5% while maintaining the output that satisfies all requested outputs, compared to simply distributing the output by 50%.

As another example, it will be described a case in which the output is distributed according to the present disclosure and the faulty output limit information is additionally set to 700 Nm. In the case of the first output section information, the section distribution winding may be set to a normal first winding. In addition, since the size of 800 Nm of the requested output information 510 exceeds the size of 500 Nm of the reference output information 520, the section size may be set to a size of 500 Nm corresponding to the size of the reference output information 520.

In the case of the second output section information, the section distribution winding may be set to the failed second winding. The section size may be set to a size of 200 Nm excluding the size of 500 Nm distributed to the normal first winding in the first output section based on 700 Nm corresponding to the faulty limit output information instead of 800 Nm of the requested output information 510.

In this case, since 500 Nm is output by the normal first winding in the first output section and 300 Nm is output by the failed second winding in the second output section, therefore, the output may be 500 Nm+200 Nm=700 Nm, thus, the output of 700 Nm of the size of 800 Nm of the requested output information 510, that is, 87.5% of the requested output is satisfied.

In addition, since the portion output by the failed second winding in the second output section corresponds to 200 Nm, torque ripple occurs at the 28.6% portion corresponding to 300 Nm of the total output of 700 Nm.

Accordingly, in the case where the requested output exceeds the reference output, if the output is distributed according to the present disclosure, the torque ripple due to the failure of the secondary winding can be reduced from 50% to 28.6% while maintaining the output that satisfies 87.5% of the requested outputs, compared to simply distributing the output by 50%.

Figure 6A:
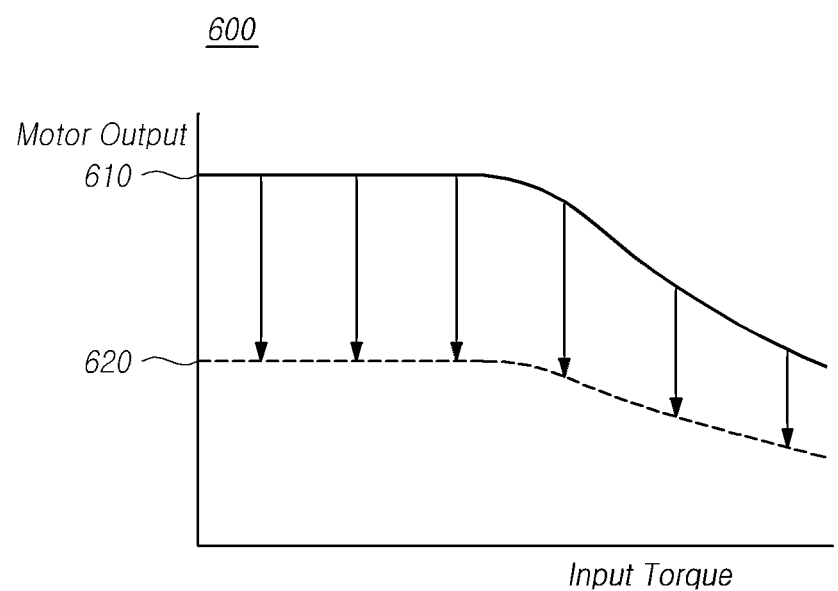
FIGS. 6A and 6B are graphs exemplarily illustrating an output method in the case that some windings fail in controlling a steering motor according to another embodiment.
Figure 6B:
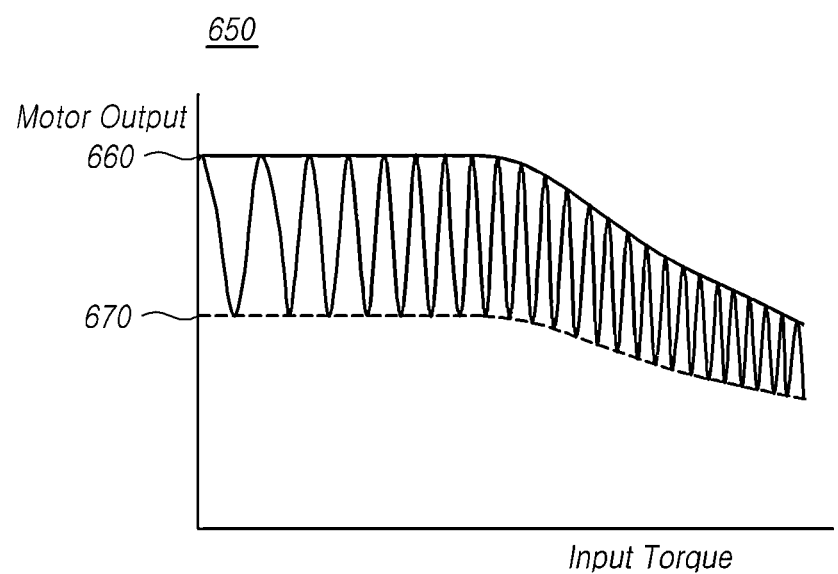

FIGS. 6A and 6B are graphs exemplarily illustrating an output method in the case that some windings fail in controlling a steering motor according to another embodiment.

Referring to FIGS. 6A and 6B, in the case where some windings fail while the steering motor is operating normally, the steering motor control device according to another embodiment may continue control by maintaining only the output of the normal winding and stopping the output of the failed winding, or may continue control by maintaining the output of both the normal winding and the failed winding.

Specifically, in the case that it is determined that some windings of the steering motor fail, FIG. 6A is a failure output stop graph 600 illustrating a case in which only a first normal winding output 620 is output without satisfying a first requested output 610 by maintaining only the output of the normal winding and stopping the output of the failed winding. FIG. 6B is a simple failure output graph 650 illustrating a case in which the second request output 660 is satisfied by simply maintaining both the normal winding output and the failed winding output, but torque ripple is generated in a portion exceeding a second normal winding output 670.

In this case, it is assumed that the sizes of the first requested output 610 and the second requested output 660 are the same as 800 Nm, respectively, and the sizes of the first normal winding output 620 and the second normal winding output 670 are the same as 400 Nm, respectively.

Referring to the failure output stop graph 600, the actual output includes only the 400 Nm portion of the section below the first normal winding output 620 by the normal winding, and does not include the section exceeding the first winding output 620 due to the failed winding, so that total output may be 400 Nm+0 Nm=400 Nm.

In this case, the failed winding is not used, the resulting torque ripple does not occur, but only the output of 400 Nm, which is 50% of the first requested output amount 610 of 800 Nm, is satisfied. Therefore, there is problem that the actual output amount is relatively low compared to the requested output amount.

Referring to the simple failure output graph 650, the actual output includes a section of 400 Nm, which is the second normal winding output 670 by the normal winding, and a section of 400 Nm, which is the range of the section exceeding the 400 Nm portion of the second normal winding output 670 by the failed winding and less than or equal to the 800 Nm portion of the second requested output amount 660, so that total output may be 400 Nm+400 Nm=800 Nm.

In this case, since the second requested output 660, 800 Nm, is satisfied, the actual output amount is relatively high compared to the requested output. However, since the section in which torque ripple occurs due to a failed winding corresponds to 50% of 400 Nm compared to the total 800 Nm, there is a problem in that torque ripple is relatively large.

Figure 7:
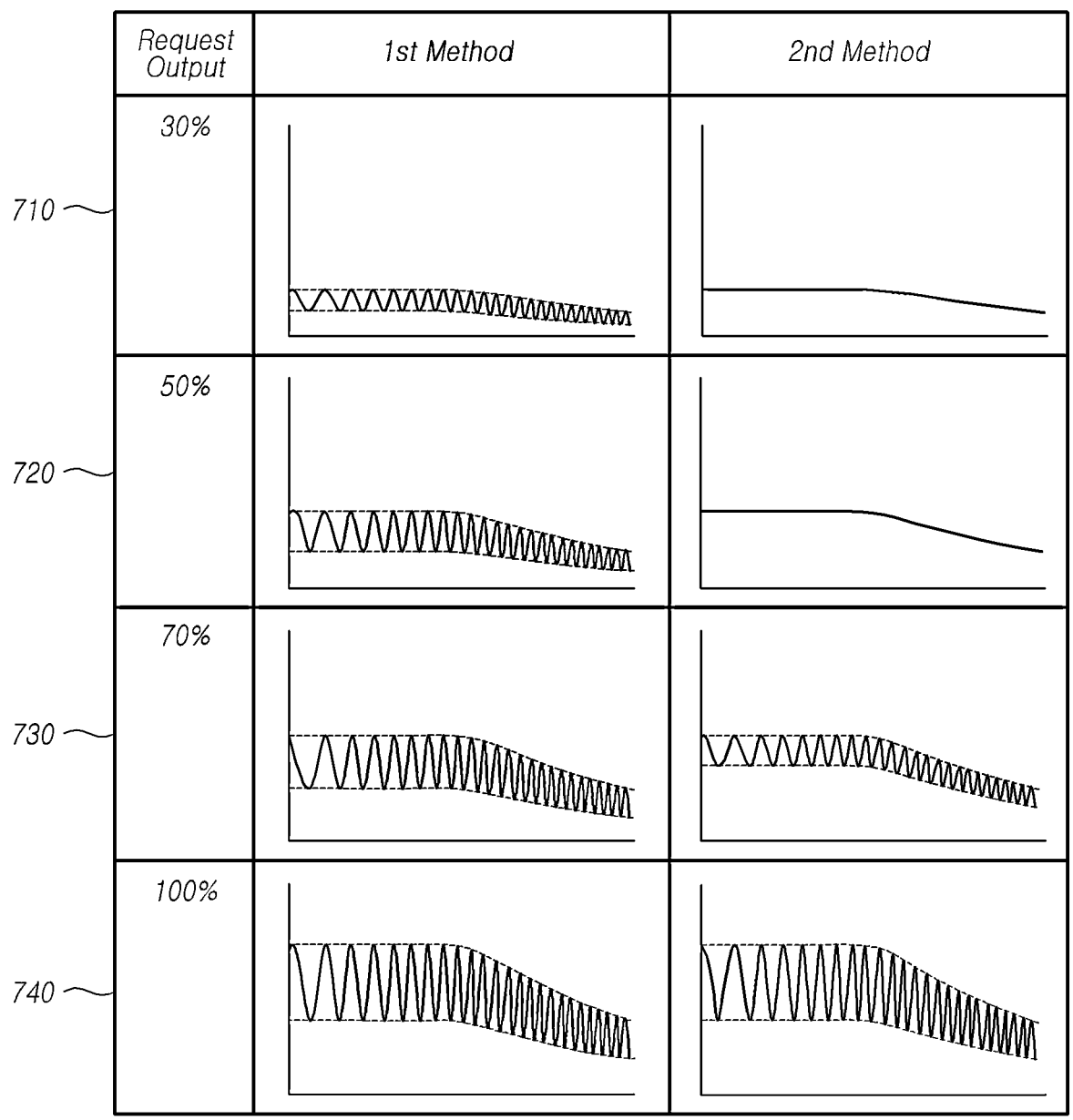
FIG. 7 is a table illustrating graphs in which an output method is applied for each requested output in the case that some windings fail in controlling a steering motor according to another embodiment.

FIG. 7 is a table illustrating graphs in which an output method is applied for each requested output in the case that some windings fail in controlling a steering motor according to another embodiment.

Referring to FIG. 7, in the control of the steering motor according to another embodiment, each of the graphs has input torque as the X axis and motor output as the Y axis, as in the graphs shown in FIGS. 2 to 6. FIG. 7 illustrates the graphs according to the requested output and the output distribution method for each winding.

Specifically, assuming that the total maximum output of the steering motor 200 is 100%, the second row of the table illustrates a case where the requested output is 30%, the third to fifth rows of the table illustrate the cases where the requested output is 50%, 70% and 100%, respectively. The second column of the table illustrate the graphs applying the "first method" in which 50% of the requested output is distributed to normal windings and 50% to failed windings. In addition, the third column of the table illustrate the graphs applying the "second method" in which the part corresponding to the maximum output of the winding is preferentially distributed to the normal winding, and the rest of the total maximum output excluding the output distributed to the normal winding is distributed to the failed winding.

In the case of the embodiment in which the requested output is 30% in the second row of the illustrated table, referring to the graph in second row and second column to which the first method is applied, the actual output amount compared to the total maximum output corresponds to 30% by adding 15% by the normal winding and 15% by the failed winding. Accordingly, the actual output compared to the requested output is (15%+15%)/30%=100%, which satisfies 100% of the requested output, however, there in a problem that the torque ripple compared to the requested output due to the failed winding is generated by 15%/30%=50%.

On the other hand, referring to the graph of second row and third column to which the second method is applied, the actual output amount compared to the total maximum output corresponds to 30% due to the normal winding, and accordingly, the actual output amount compared to the requested output is (30%+0%)/30%=100%, which satisfies 100% of the requested output. In addition, the torque ripple compared to the requested output is generated by 0%/30%=0%, so there is no torque ripple generated by a failed winding.

In the case of the embodiment in which the requested output is 50% in the third row of the illustrated table, referring to the graph in third row and second column to which the first method is applied, the actual output amount compared to the total maximum output corresponds to 50% by adding 25% by the normal winding and 25% by the failed winding. Accordingly, the actual output compared to the requested output is (25%+25%)/50%=100%, which satisfies 100% of the requested output, however, there in a problem that the torque ripple compared to the requested output due to the failed winding is generated by 25%/50%=50%.

On the other hand, referring to the graph of third row and third column to which the second method is applied, the actual output amount compared to the total maximum output corresponds to 50% due to the normal winding, and accordingly, the actual output amount compared to the requested output is (50%+0%)/50%=100%, which satisfies 100% of the requested output. In addition, the torque ripple compared to the requested output is generated by 0%/50%=0%, so there is no torque ripple generated by a failed winding.

In the case of the embodiment in which the requested output is 70% in the fourth row of the illustrated table, referring to the graph in fourth row and second column to which the first method is applied, the actual output amount compared to the total maximum output corresponds to 70% by adding 35% by the normal winding and 35% by the failed winding. Accordingly, the actual output compared to the requested output is (35%+35%)/70%=100%, which satisfies 100% of the requested output, however, there in a problem that the torque ripple compared to the requested output due to the failed winding is generated by 35%/70%=50%.

On the other hand, referring to the graph of fourth row and third column to which the second method is applied, the actual output amount compared to the total maximum output corresponds to 70% by adding 50% by the normal winding and 20% by the failed winding, and accordingly, the actual output amount compared to the requested output is (50%+20%)/70%=100%, which satisfies 100% of the requested output. In addition, the torque ripple compared to the requested output is generated by 20%/70%=28.6%, so the torque ripple due to a failed winding may be generated less than 50% of the first method.

In the case of the embodiment in which the requested output is 100% in the fifth row of the illustrated table, referring to the graph in fifth row and second column to which the first method is applied, the actual output amount compared to the total maximum output corresponds to 100% by adding 50% by the normal winding and 50% by the failed winding. Accordingly, the actual output compared to the requested output is (50%+50%)/100%=100%, which satisfies 100% of the requested output, however, there in a problem that the torque ripple compared to the requested output due to the failed winding is generated by 50%/100%=50%.

On the other hand, referring to the graph of fifth row and third column to which the second method is applied, the actual output amount compared to the total maximum output corresponds to 100% by adding 50% by the normal winding and 50% by the failed winding, and accordingly, the actual output amount compared to the requested output is (50%+50%)/100%=100%, which satisfies 100% of the requested output. In addition, the torque ripple compared to the requested output is generated by 50%/100%=50%.

In summary, if the second method according to the present disclosure is applied, the torque ripple problem may be improved as compared with the first method of simply maintaining the output of the normal winding and the failed winding. In particular, torque ripple does not occur in a load of 50% or less, which is the main steering area, and the steering feeling can be greatly improved.

In the method of simply maintaining the output of a normal winding and a failed winding, torque ripple occurs even at a low output since the requested output is divided by 50% and is responsible for the output. However, according to the present disclosure, the requested output of a normally operating motor is sequentially distributed by changing a distribution method.

That is, torque ripple does not occur until the requested output is 50% or less, and the output may be increased by generating additional torque using a failed winding accompanied by torque ripple only for more than 50%, and since torque ripple is accompanied only for this part, torque ripple may be reduced.

As a result, it is possible to provide an effect of providing steering assist so that avoidance steering is easier, and, at the same time, reducing the driver's steering fatigue and the steering discomfort.

The steering motor control device 100 may be implemented as an electronic controller unit (ECU), a microcomputer, or the like.

In an embodiment, a computer system (not shown) such as the steering motor control device 100 may be implemented as an electronic control unit. The electronic control unit may include at least one or more elements of one or more processors, memories, storage unit, user interface input unit and user interface output unit, which may communicate with each other via a bus. Furthermore, the electronic control unit may also comprise a network interface for connecting to the network. The processor may be a CPU or a semiconductor device that executes processing instructions stored in memory and/or storage unit. Memory and storage unit may include various types of volatile/non-volatile storage media. For example, memory may include ROM and RAM.

Hereinafter, the steering motor control device 100 will be briefly described again from the viewpoint of the method, and overlapping contents of the above description will be omitted if necessary, but may be applied to the method below.

Figure 8:
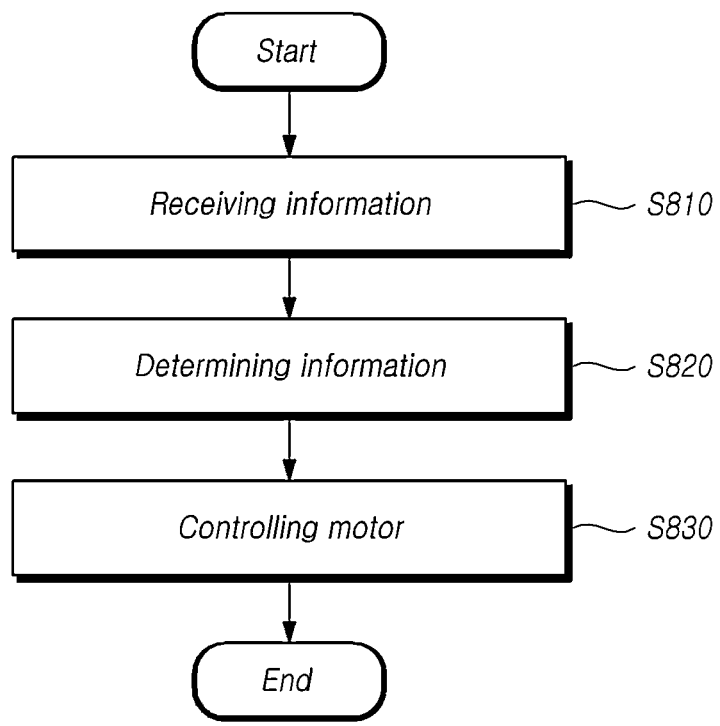
FIG. 8 is a flowchart of a steering motor control method according to the present disclosure.

FIG. 8 is a flowchart of a steering motor control method according to the present disclosure.

Referring to FIG. 8, the steering motor control method according to the present disclosure may include an information receiving step (S810), an information determining step (S820), and a motor controlling step (S830).

The information receiving step (S810) may include receiving requested output information regarding a requested output of the steering motor. In this case, the requested output information may include information about the corresponding output amount in the case that it is requested to output a certain physical amount by driving the steering motor. For example, in steering assist control, the requested output information may include information on a required amount of torque required for a steering motor.

In addition, the information receiving step (S810) may include receiving steering motor information including first winding information about the first winding and second winding information about the second winding.

For example, the steering motor information may include information on the total maximum output of the steering motor, the maximum output and normal operation status of each winding, other performance, specification, and the like.

The information determining step (S820) may include determining, if one of the first winding and the second winding is determined to fail, output distribution information based on the requested output information and predetermined reference output information, and determining normal winding control information for a normal winding and faulty winding control information for a failed winding among the first winding and the second winding based on the output distribution information.

The motor controlling step (S830) may include controlling an operation of the normal winding based on the normal winding control information and controlling an operation of the failed winding based on the faulty winding control information. In this case, the operation control of the winding may include controlling the output operation and output amount of each winding.

Figure 9:
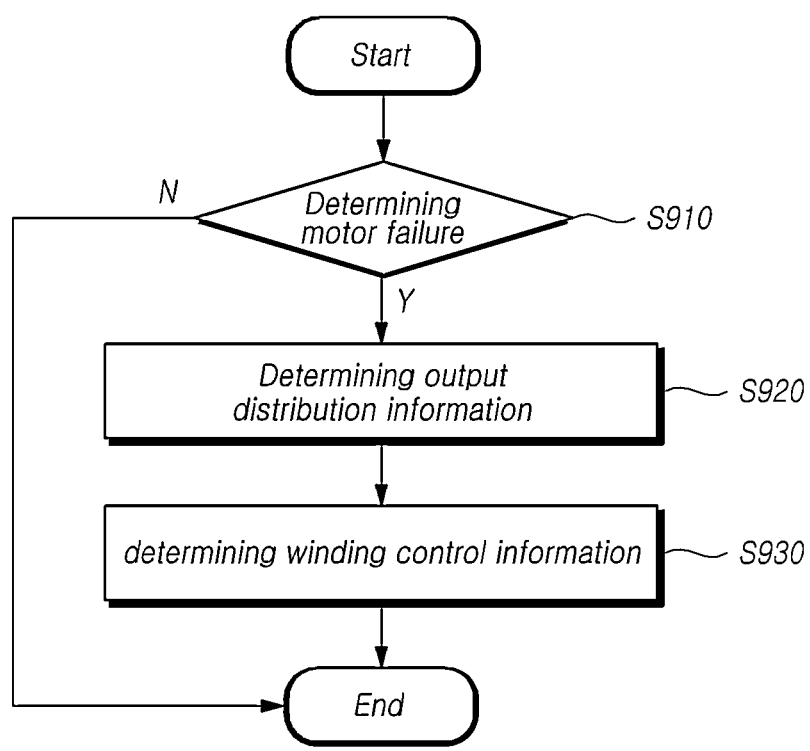
FIG. 9 is a flowchart illustrating a step of determining information in a steering motor control method according to an embodiment.

FIG. 9 is a flowchart illustrating the information determining step in a steering motor control method according to an embodiment.

Referring to FIG. 9, the information determining step (S820) according to an embodiment may include a winding failure determination step (S910), a output distribution information setting step (S920), and a winding control information determination step (S930).

In the winding failure determination step (S910), it is possible to determine failure of each of the first winding and the second winding based on at least one of the requested output information and the steering motor information.

In this case, it is possible to determine whether the first winding fails based on the first winding information included in the steering motor information, and it is possible to determine whether the second winding fails based on the second winding information.

In the output distribution information setting step (S920), if it is determined that one of the first winding and the second winding fails, output distribution information may be determined based on at least one of the requested output information and the reference output information.

In the output distribution information setting step (S920), the output distribution information may be set in advance before determining whether the first winding and the second winding have failed, and may be reset if it is determined that one of the first and second windings has failed.

Here, the reference output information may include information about a criterion for distributing output to each of the first winding and the second winding in the steering motor. Alternatively, the reference output information may include information about a criterion for distributing output to each of the normal winding and the failed winding.

In the winding control information determination step (S930), the normal winding control information for a normal winding and faulty winding control information for a failed winding may be determined based on the output distribution information.

In this case, the normal winding control information may include information about a normal winding determined based on the first winding information and the second winding information. In addition, the normal winding control information may include information about an output section for which distribution is required for a normal winding, information about the size of an output amount, based on the first output section information and the second output section information.

The faulty winding control information may include information about a failed winding determined based on the first winding information and the second winding information. In addition, based on the first output section information and the second output section information, the faulty winding control information may include information about an output section for which distribution is required for a failed winding, information about the size of an output amount, and the like.

Figure 10:
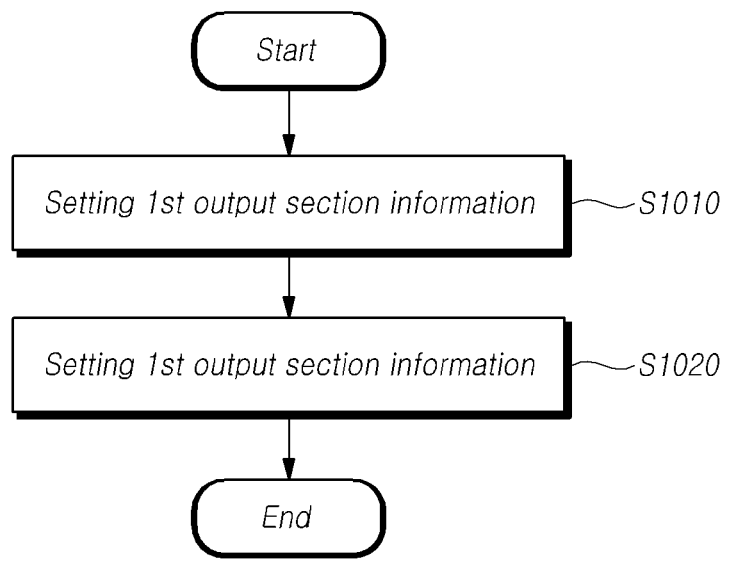
FIG. 10 is a flowchart illustrating a step of determining output distribution information in a steering motor control method according to an embodiment.

FIG. 10 is a flowchart illustrating a step of determining output distribution information in a steering motor control method according to an embodiment.

Referring to FIG. 10, the step of determining output distribution information (S920) according to an embodiment may include a step of setting first output section information (S1010) and a step of setting second output section information (S1020).

In this case, the output section may be divided into a first output section and a second output section based on the requested output information and the reference output information. In addition, the first output section information and the second output section information may be determined to include information on section sizes and section distribution windings for each output section.

In the step of setting first output section information (S1010), for the first output section determined based on the requested output information and the reference output information, the first output section information may be determined to include information on section distribution winding and section size.

In this case, section distribution windings may be set so that normal windings are preferentially distributed in the first output section. In addition, the section size may be determined based on the requested output information and the reference output information.

For example, if the requested output information is equal to or smaller than the reference output information, the section size may be determined to be a size corresponding to the requested output information. Alternatively, if the requested output information exceeds the reference output information, the section size may be determined as a size corresponding to the reference output information.

In the step of setting the second output section information (S1020), for a second output section determined based on the requested output information and the reference output information, the second output section information may be determined to include information on section distribution windings and section sizes.

In this case, section distribution windings may be set to distribute the failed windings in the second output section. Further, the section size may be determined by subtracting the section size of the first output section from the requested output information.

For example, if the requested output information is less than or equal to the reference output information, since the size of the requested output information and the size of the first output section are the same, the section size of the second output section may be determined to be 0.

Alternatively, if the requested output information exceeds the reference output information, since the section size of the first output section is set to the reference output information, the section size of the second output section may be set to a size obtained by subtracting the size of the reference output information from the size of the requested output information.

As described above, the present disclosure may provide an device and method for controlling a steering motor capable of maintaining a high actual output compared to a requested output even if some windings of the steering motor fail.

In addition, the present disclosure may provide an device and method for controlling a steering motor capable of reducing torque ripple while outputting using both a normal winding and a failed winding.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

What is claimed is:

1. A steering motor control device for controlling a steering motor including a first winding and a second winding comprising:

a receiver configured to receive requested output information on an output requested for the steering motor;

a determiner configured to, if one of the first winding and the second winding is determined to fail, determine output distribution information based on the requested output information and reference output information, and determine normal winding control information for a normal winding and faulty winding control information for a failed winding among the first winding and the second winding based on the output distribution information; and a controller configured to control an operation of the normal winding based on the normal winding control information and control an operation of the failed winding based on the faulty winding control information, wherein the output distribution information comprises first output section information regarding a first output section of the steering motor and second output section information regarding a second output section of the steering motor, wherein the determiner divides the an output section of the steering motor into the first output section and the second output section based on the requested output information and the reference output information, and determine the first output section information and the second output section information including information about section distribution winding and section size for each of the first output section and the second output section, and wherein, if the requested output information exceeds the reference output information, the determiner determines that the section distribution winding of the first output section information is the normal winding and determines the section size of the first output section information to a size of the reference output information, and determines that the section distribution winding of the second output section information is the failed winding and determines the section size of the second output section information as a size obtained by subtracting the reference output information from the requested output information.

2. The steering motor control device of claim 1, wherein, if the requested output information is less than or equal to the reference output information, the determiner determines that the section distribution winding of the first output section information is the normal winding, and determines the section size of the first output section information to a size of the requested output information.

3. The steering motor control device of claim 1, wherein the determiner further sets faulty limit output information regarding a limit output of the steering motor if one of the first winding and the second winding is determined to fail,
wherein, if a size of the requested output information exceeds a size of the faulty limit output information, the determiner re-determines the section size of the second output section information as a size obtained by subtracting the section size of the first output section information from the size of the faulty limit output information.

4. The steering motor control device of claim 1, wherein the controller comprises a first controller for controlling an output of the first winding and a second controller for controlling an output of the second winding.

5. A steering motor control method for controlling a steering motor including a first winding and a second winding comprising:
receiving requested output information on an output requested for the steering motor;
determining, if one of the first winding and the second winding is determined to fail, output distribution information based on the requested output information and predetermined-reference output information, and determining normal winding control information for a normal winding and faulty winding control information for a failed winding among the first winding and the second winding based on the output distribution information; and
controlling an operation of the normal winding based on the normal winding control information and controlling an operation of the failed winding based on the faulty winding control information,
wherein the output distribution information comprises first output section information regarding a first output section of the steering motor and second output section information regarding a second output section of the steering motor
wherein the determining comprises dividing an output section of the steering motor into the first output section and the second output section based on the requested output information and the reference output information, and determining the first output section information and the second output section information including information about section distribution winding and section size for each output section, and
wherein, the determining comprises, if the requested output information exceeds the reference output information, determining that the section distribution winding of the first output section information is the normal winding and determining the section size of the first output section information to a size of the reference output information, and determining that the section distribution winding of the second output section information is the failed winding and determining the section size of the second output section information as a size obtained by subtracting the reference output information from the requested output information.

6. The steering motor control method of claim 5, wherein, the determining comprises, if the requested output information is less than or equal to the reference output information, determining that the section distribution winding of the first output section information is the normal winding, and determining the section size of the first output section information to a size of the requested output information.

7. The steering motor control method of claim 5, wherein the determining further comprises setting faulty limit output information regarding a limit output of the steering motor if one of the first winding and the second winding is determined to fail,
wherein, if a size of the requested output information exceeds a size of the faulty limit output information, the determining comprises re-determining the section size of the second output section information as a size obtained by subtracting the section size of the first output section information from the size of the faulty limit output information.

* * * * *